(12) United States Patent
Sheldon

(10) Patent No.: US 7,431,452 B2
(45) Date of Patent: Oct. 7, 2008

(54) LENS ATTACHMENT TO EYEWEAR HAVING CUSHION PAD

(76) Inventor: Brent Sheldon, Suite #3, 72 Sherbrooke West, Montreal, Quebec (CA) H2X 1X3

(*) Notice: Subject to any disclaimer, the term of this patent is extended or adjusted under 35 U.S.C. 154(b) by 43 days.

(21) Appl. No.: 11/447,054

(22) Filed: Jun. 6, 2006

(65) Prior Publication Data

US 2007/0279576 A1 Dec. 6, 2007

(51) Int. Cl.
*G02C 5/00* (2006.01)
*G02C 1/00* (2006.01)

(52) U.S. Cl. .................. 351/154; 351/86; 351/106
(58) Field of Classification Search ............ 351/41, 351/44, 83–86, 103–109, 154
See application file for complete search history.

(56) References Cited

U.S. PATENT DOCUMENTS

| | | | |
|---|---|---|---|
| 3,638,240 A | 2/1972 | Militello | |
| 4,196,982 A | 4/1980 | Watkins | |
| 4,302,080 A * | 11/1981 | Bononi | 351/139 |
| 4,822,671 A | 4/1989 | Carper et al. | |
| 5,331,355 A | 7/1994 | Frank et al. | |
| 5,603,125 A | 2/1997 | Chou | |
| 5,711,035 A | 1/1998 | Haslbeck | |
| 5,771,499 A | 6/1998 | Monaco et al. | |
| 5,867,841 A | 2/1999 | Chiang | |
| 5,966,745 A | 10/1999 | Schwartz et al. | |
| 6,196,681 B1 * | 3/2001 | Canavan | 351/106 |
| D465,507 S | 11/2002 | Wang | |
| 6,676,257 B2 | 1/2004 | Sheldon | |
| 6,692,124 B2 | 2/2004 | Katz et al. | |
| 6,711,754 B2 | 3/2004 | Chou | |
| 6,810,536 B2 | 11/2004 | Yamamoto et al. | |
| 6,899,427 B1 | 5/2005 | Sheldon | |
| 7,249,842 B2 * | 7/2007 | Conrad et al. | 351/83 |
| 2005/0081282 A1 | 4/2005 | Yu | |
| 2005/0210568 A1 | 9/2005 | Sheldon | |
| 2007/0132944 A1 * | 6/2007 | Sheldon | 351/86 |

FOREIGN PATENT DOCUMENTS

| | | |
|---|---|---|
| EP | 0 967 061 A2 | 12/1999 |
| JP | 11-048357 | 2/1999 |
| WO | WO-02/068257 | 9/2002 |

\* cited by examiner

*Primary Examiner*—Huy K Mai
(74) *Attorney, Agent, or Firm*—Ogilvy Renault LLP; Wayne H. Yan

(57) ABSTRACT

The present invention provides a structural arrangement and a method for attaching lenses to a frame of eyewear. The frame includes a major portion of substantially rigid material and a secondary portion of a softer material. A retainer is formed integrally with the secondary portion of the frame during formation of the secondary portion in a molding process in the presence of the lens such that the retainer contacts the lens to secure the lens in attachment with the frame body of the eyewear.

20 Claims, 6 Drawing Sheets

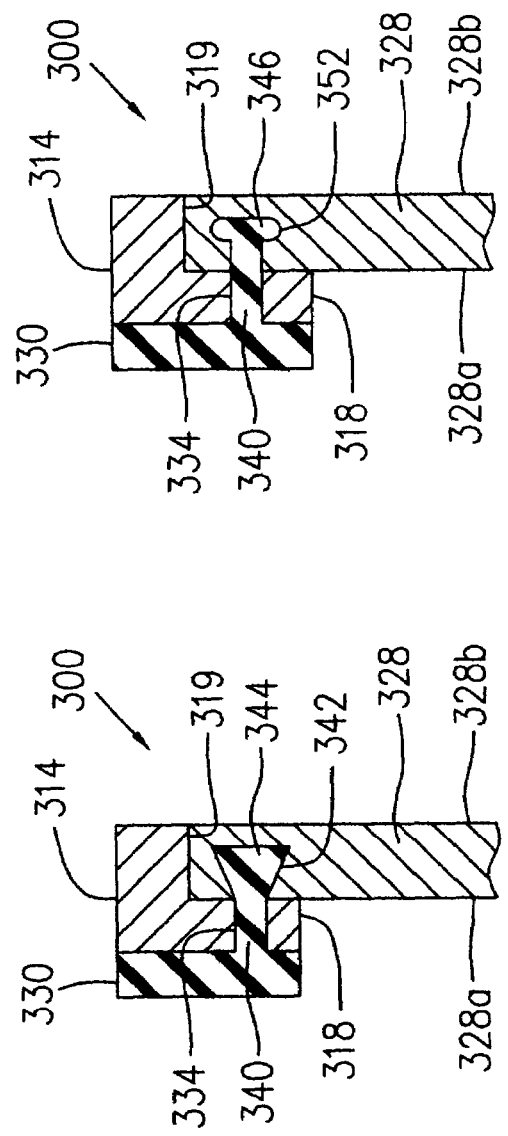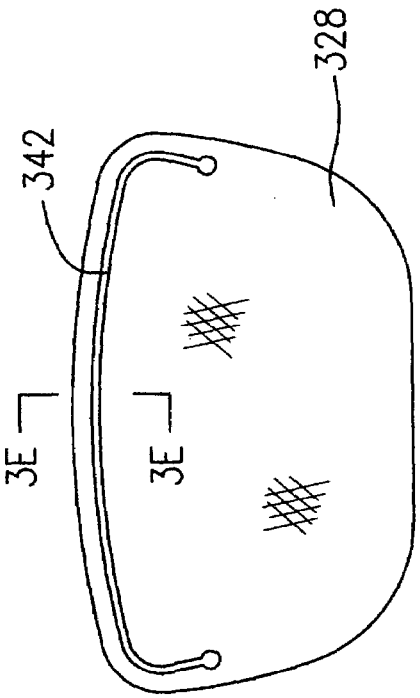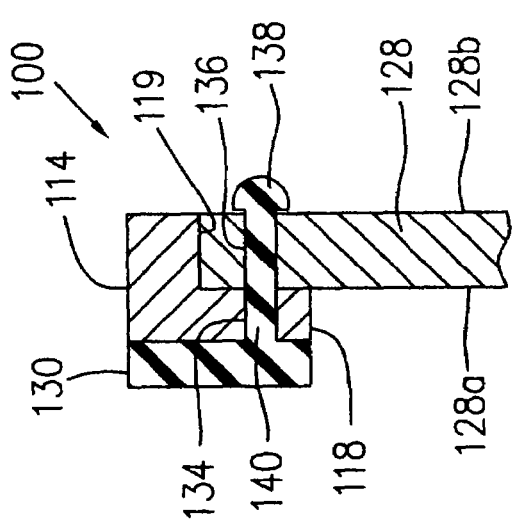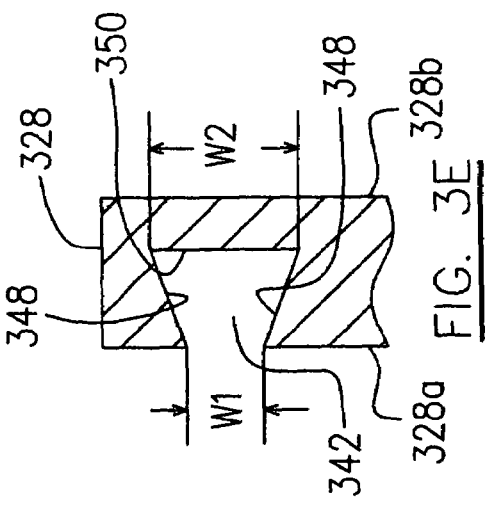
FIG. 3C
FIG. 3D
FIG. 3B
FIG. 1B
FIG. 3E

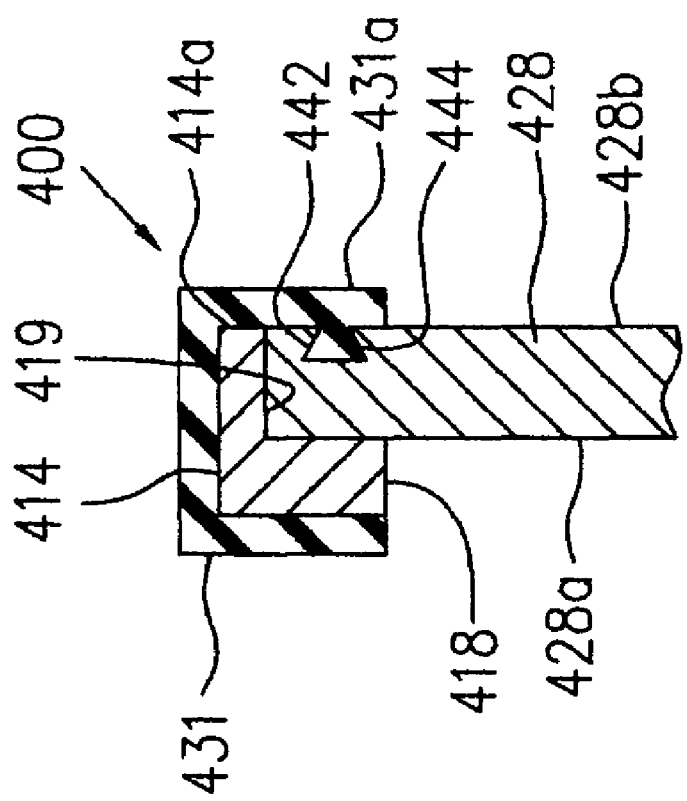
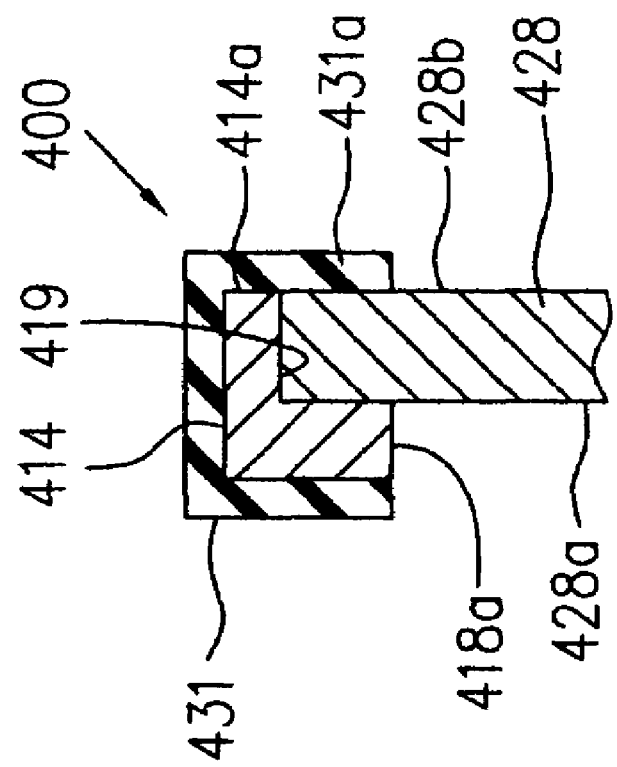

LENS ATTACHMENT TO EYEWEAR HAVING CUSHION PAD

FIELD OF THE INVENTION

The present invention relates to eyewear, and more particularly to a method and a structural arrangement for attaching lenses to frames of eyewear.

BACKGROUND OF THE INVENTION

Eyewear including eyeglasses and goggles for various purposes, conventionally include a frame structure made of a substantially rigid material such as a rigid plastic material, and one or two lenses attached thereto. The substantially rigid frame structure is used to support the lens or lenses thereon and is configured in accordance with and abuts an eyewear user's face around or near the eyes. The frame structure is retained on the user's head for example, by temples or an elastic strip. In selective types of eyewear the frame structure further includes cushioning pads attached at the rear side thereof. The cushioning pads are usually made of a soft material such as rubber and are attached to either the entire rear side of the frame structure or to one or more selected locations at the rear side of the frame structure such that the soft cushioning pad rather than the body of the rigid frame structure contacts the user's face, and functions to protect the user's skin particularly when the user wears the eyewear for a relatively long period of time. In an accident, the cushioning pad also absorbs impact applied to the eyewear and thus protects the user's face.

In conventional eyewear, whether or not the cushioning pad is attached thereto, the frame structure is configured to form some manner of retaining configuration for engagement with the lens. For example, the frame structure may define a pair of apertures with very shallow grooves on the inner periphery thereof such that lenses can be received in the apertures and attached thereto by a "click in" action which forces elastic deformation of either or both the lenses and a portion of the frame body defining the respective apertures when each lens is pressed into one of the apertures. There are also other various retaining configurations in conventional eyewear for attachment of lenses thereto. Nevertheless, there is still a need for new methods and structural arrangements for attaching lenses to frames of eyewear of different types.

SUMMARY OF THE INVENTION

One object of the present invention is to provide a structural arrangement and a method for attaching lenses to eyewear.

In accordance with one aspect of the present invention, a structural arrangement of eyewear is provided for attaching a substantially rigid lens to a frame thereof, which comprises a frame body made of a substantial rigid material; a secondary portion of the frame attached to the frame body at a rear side thereof; and at least one retainer integrated with the secondary portion during formation of the secondary portion, the retainer securing the lens in attachment to the frame body.

The secondary portion preferably comprises at least one pad softer than the frame body for contacting the skin of a user. The retainer preferably contacts at least one surface of the lens other than a surface of the rear side of the lens in order to maintain the rear side of the lens resting on the frame body.

In accordance with another aspect of the present invention, there is a method provided for attaching a substantially rigid lens to a substantially rigid plastic frame body of eyewear, the frame body at a rear side thereof having at least one pad attached thereto, the method comprising a step of forming a retainer together with the pad during formation of the pad in the presence of the lens in a molding process such that the retainer is formed in attachment with the lens to secure same to the frame body.

In accordance with a further aspect of the present invention there is a method for attaching a substantially rigid lens to a frame of eyewear, the frame including a major portion of substantially rigid plastic material to form a substantial configuration of the frame, and a secondary portion of a material attached to the major portion, the method comprising a step of forming a retainer together with the secondary portion during formation of the secondary portion in a molding process in the presence of the lens, the retainer being formed in contact with the lens to secure the lens in attachment to the major portion of the frame.

Other features and advantages of the present invention will be better understood with reference to the preferred embodiments described hereinafter.

BRIEF DESCRIPTION OF THE DRAWINGS

Reference will now be made to the accompanying drawings, showing by way of illustration the preferred embodiments thereof, in which:

FIG. 1B is a partial cross-sectional view of the eyeglasses of FIG. 1A taken along line 1B-1B, showing a structural arrangement thereof;

FIG. 3B is a partial cross-sectional view of the eyeglasses of FIG. 3A, taken along line 3-3 showing a structural arrangement thereof;

FIG. 3C is a partial cross-sectional view of the eyeglasses of FIG. 3A, taken along line 3-3, showing an alternative structural arrangement thereof;

FIG. 3D is a rear elevational view of a lens of the eyeglasses of FIG. 3A, showing a hollow space defined in the lens for attachment thereof to the frame of the eyeglasses;

FIG. 3E is a partial cross-sectional view of the lens of FIG. 3D, taken along line 3E-3E, showing details of the hollow space defined therein;

FIG. 4B is a partial cross-sectional view of the eyeglasses of FIG. 4A, taken along line 4-4, showing a structural arrangement thereof; and FIG. 4C is a partial cross-sectional view of the eyeglasses of FIG. 4A, taken along line 4-4, showing an alternative structural arrangement thereof.

DETAILED DESCRIPTION OF THE PREFERRED EMBODIMENT

Figure 1A:
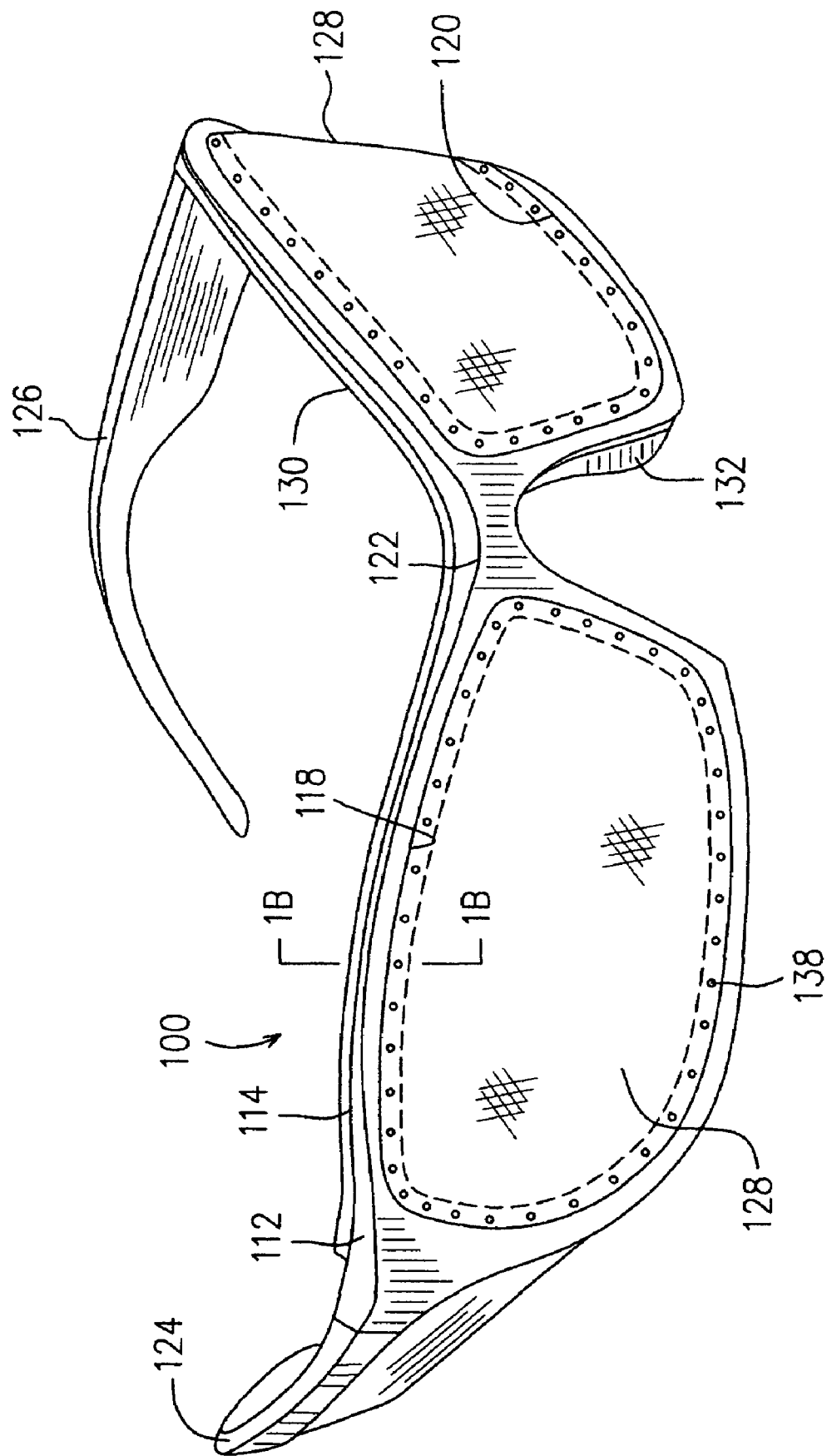
FIG. 1A is a perspective view of a pair of eyeglasses incorporating an embodiment of the present invention, showing the attached lenses secured to the frame by retainers integrated with a cushioning pad of the eyeglasses.

FIGS. 1A and 1B illustrate an embodiment of the present invention in which eyewear, for example a pair of eyeglasses generally indicated by numeral 100, is shown. Nevertheless, any other type of eyewear which includes a substantially rigid frame body to form a substantial configuration of the frame and substantially rigid lenses attached thereto, such as prescription eyeglasses, sunglasses, protective work goggles, sports goggles, etc., is included in the concept of the present invention as illustrated by the eyeglasses 100 and in further embodiments to be described hereinafter.

The eyeglasses 100 include a frame structure 112 having a major portion or a frame body 114, preferably made of a substantially rigid plastic material to form a substantial frame configuration of the eyeglasses 100. The major portion or frame body (referred to hereinafter as the "frame body") defines apertures 118, 120 therein, respectively. A bridge 122 interconnects the left-hand and right-hand portions of the frame body 114. A pair of temples 124, 126 which are preferably made of the same substantially rigid plastic material, are pivotally attached to opposed outer ends of the frame body 114. A pair of substantially rigid lenses 128 are attached to the frame body 114 covering the respective apertures 118, 120.

The frame structure 112 of eyewear 100 further includes a secondary portion thereof which is made of a material softer than the material of the substantially rigid frame body 114.

The secondary portion of the frame structure 112 in this embodiment is preferably a cushioning pad 130 which is attached to the frame body 114 at the rear side thereof and is contoured to contact the user's skin when eyewear 100 is worn on the user's head. The cushioning pad 130 is preferably made of rubber or a soft plastic material to provide a comfortable contact with the user's skin and to reduce impact to the user's face during an accident. The cushioning pad 130 can be formed as a single piece covering most of the rear side of the frame body 114 (the entire peripheral area around the respective apertures 118, 120). The cushioning pad 130 preferably further includes a pair of soft nose supports 132, as illustrated in FIG. 1A. Optionally, one or more cushioning pads 130 can be attached to one or several selected locations on the rear side of the frame body 114 such as the upper portion of the rear side of the frame body 114.

Due to the symmetrical configuration of the frame structure 112 of eyewear 100, the attachment of the lenses 128 to the frame body 114 will be described only with reference to the aperture 118. The frame body 114 defines an annular peripheral recess 119 at the front side thereof, around aperture 118. The lens 128 is snuggly received in the annular peripheral recess 119 with a rear side 128a of the lens 128 at its peripheral area, resting on the frame body 114. The frame body 114 further defines a plurality of circumferentially spaced apart holes 134 extending therethrough which are located within the annular peripheral recess around the aperture 118. A plurality of holes 136 extend through the lens 128, and are located in the peripheral area thereof. The respective holes 134 and 136 are in alignment for receiving a plurality of studs 140 extending therethrough. The studs 140 are integrated with the cushioning pad 130 during formation of the cushioning pad 130 and each preferably includes an enlarged end 138 thereof to abut a front side 128b of the lens 128, thereby forming an integral retainer of the cushioning pad 130 to secure the lens 128 in attachment to the frame body 114.

Figure 2:
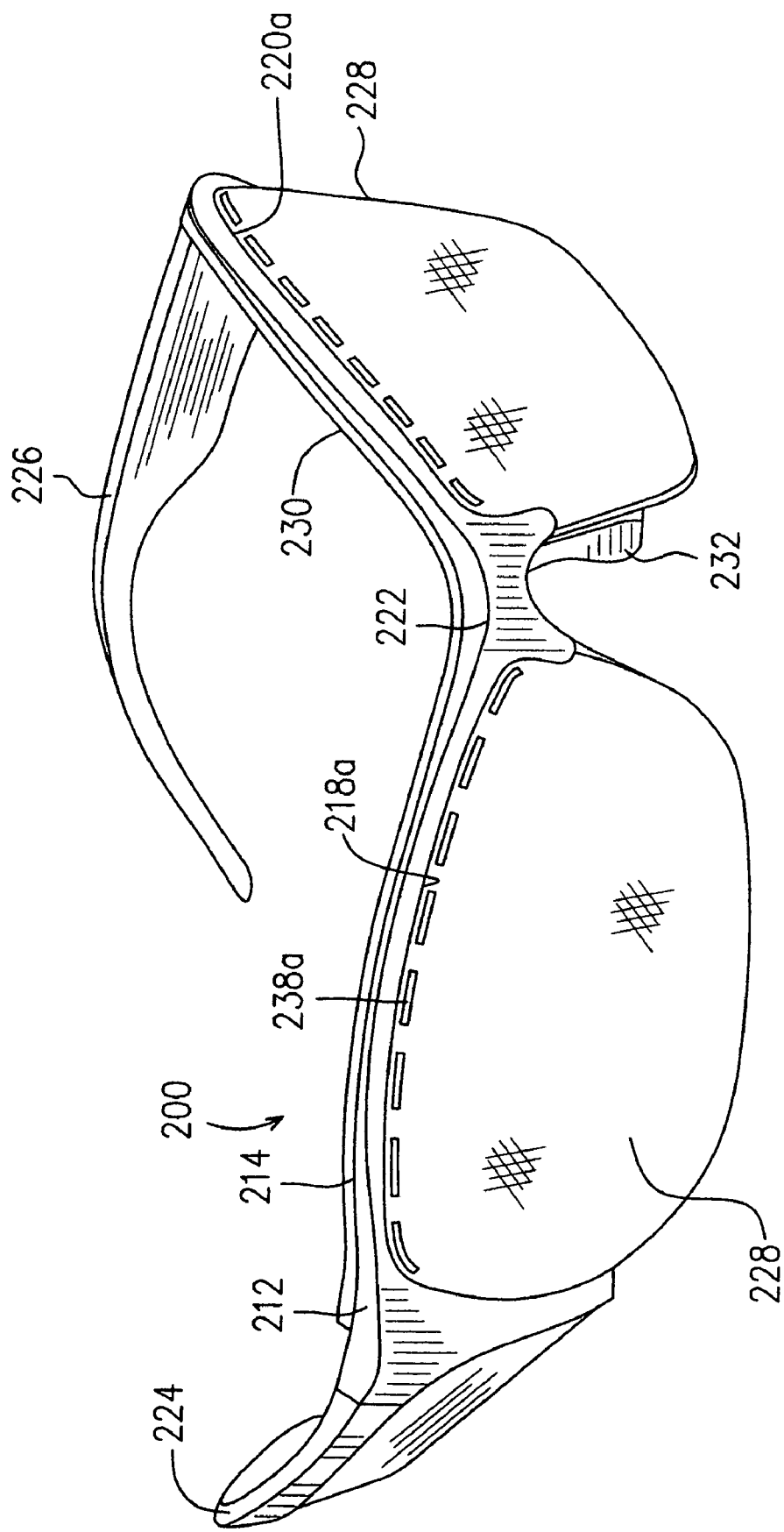
FIG. 2 is a perspective view of a pair of eyeglasses incorporating another embodiment of the present invention, showing a structural arrangement thereof similar to that of FIG. 1B.
Figure 3A:
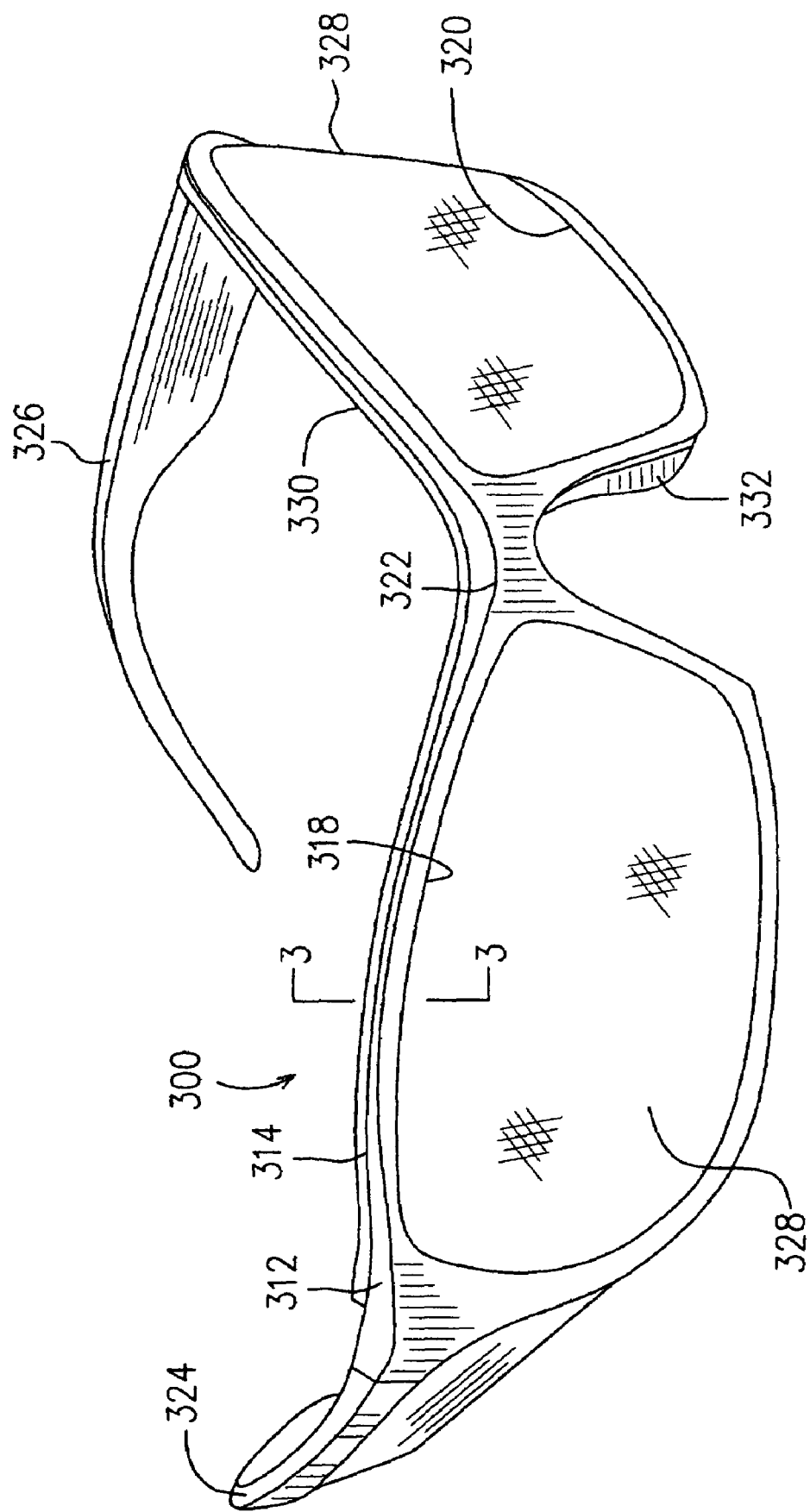
FIG. 3A is a perspective view of a pair of eyeglasses configured for attachment of the lenses to the frame thereof in accordance with a further embodiment of the present invention.

FIG. 2 illustrates another embodiment of the present invention in which a pair of eyeglasses 200 generally includes components similar to those of the eyeglasses 100 of FIGS. 1A and 1B. Components of the eyeglasses 200 are indicated by numerals in the 200 series with the last two digits similar to the numerals indicating similar components of the eyeglasses 100 of FIGS. 1A and 1B, comma and will not therefore be redundantly described. The difference between the eyeglasses 200 and the eyeglasses 100 of FIGS. 1A and 1B is that a lower section of the frame body 214 is cut away and the apertures 218a and 220a defined within the frame body 214 are incomplete in contrast to the complete apertures 118, 120 defined in the frame body 114 of the eyeglasses 100 of FIG. 1A.

The structural arrangement for attaching lenses 228 to the frame body 214 is slightly different from the structural arrangement of the eyeglasses 100 of FIGS. 1A and 1B. The retainer of the cushioning pad 230 is configured with an enlarged end forming an elongate bar 238a, rather than a rounded enlarged end 138 of the stud 136 shown in FIG. 1B. The lens 228 is secured in attachment to the frame body 214 only at the upper peripheral area thereof. The length of the individual elongate bar 238a can vary and two or more studs (not shown) may share one elongate bar 238a as their common enlarged end. Alternatively, the elongate bars 238a can be joined together to form a single elongate bar extending along the entire upper peripheral area of the lens 228 (not shown).

FIGS. 3A-3E illustrate a further embodiment of the present invention in which a pair of eyeglasses 300 generally include components similar to those of the eyeglasses 100 of FIGS. 1A and 1B. Components of the eyeglasses 300 are indicated by numerals in the 300 series with the last two digits similar to the numerals indicating the similar components of the eyeglasses 100 of FIGS. 1A and 1B and will not therefore be redundantly described.

The structural arrangement of eyeglasses 300 for attachment of the lenses 328 to the frame body 314 thereof is different from that illustrated in FIGS. 1A and 1B. The lens 328 is provided with a groove 342 defined as a hollow space in each of the lenses 328. The groove 342 is defined in the lens 328 on the rear side 328a thereof and extends along the upper peripheral area of the lens. The holes 334 extending through the frame body 314 are located in alignment with the groove 342 to allow the integral studs 340 of the cushioning pad 330 (the integral retainer of the cushioning pad) to protrude into the groove 342. The individual studs 340 have enlarged ends thereof joining together to form a single bar 344 extending along the groove 342.

According to the geometry and configuration of the frame body 314 and the required attachment of the lens 328 thereto, the length of the groove 342 varies and the groove 342 may be divided into a number of sections along the peripheral area of the lens 328. It should be understood that FIG. 3D is used as an example to generally illustrate the configuration of the hollow space defined in the lens for receiving the integral retainer of the cushioning pad 330 but is not intended to limit the configuration of the groove 342. The groove 342 includes opposed side walls 348 and a bottom 350. A distance W1 defined between the opposed walls 348 at the opening (not indicated) of the groove 342 is smaller than a distance W2 defined between the opposed walls. 348 at the bottom 350 of the groove 342. The single bar 344 formed by the joining enlarged ends of the individual studs 340 has a cross-section thereof which is shaped and sized similar to the cross-section of the groove 342 for snuggly fitting therein. Therefore, the single bar 344 with the integrally connected individual studs 340 constitute an integral retainer of the cushioning pad 330 which engages the lens 328 in attachment to the frame body 314.

The groove 342 can have any other cross-sectional configuration provided that the distance W1 is smaller than the distance W2. For example, a groove 352 having a T-shaped cross-sectional configuration as illustrated in FIG. 3C receives a bar 346 having a similar T-shaped cross-sectional configuration. In order to cut a groove such as 342 or 352 in the lens 328 having W1 smaller than W2, the opening size W1 may be enlarged at one or both ends of the groove 342 or 352 for entering and withdrawing a cutter, thereby forming an enlarged recess at one or both ends of the groove, as shown in FIG. 3D.

Figure 4A:
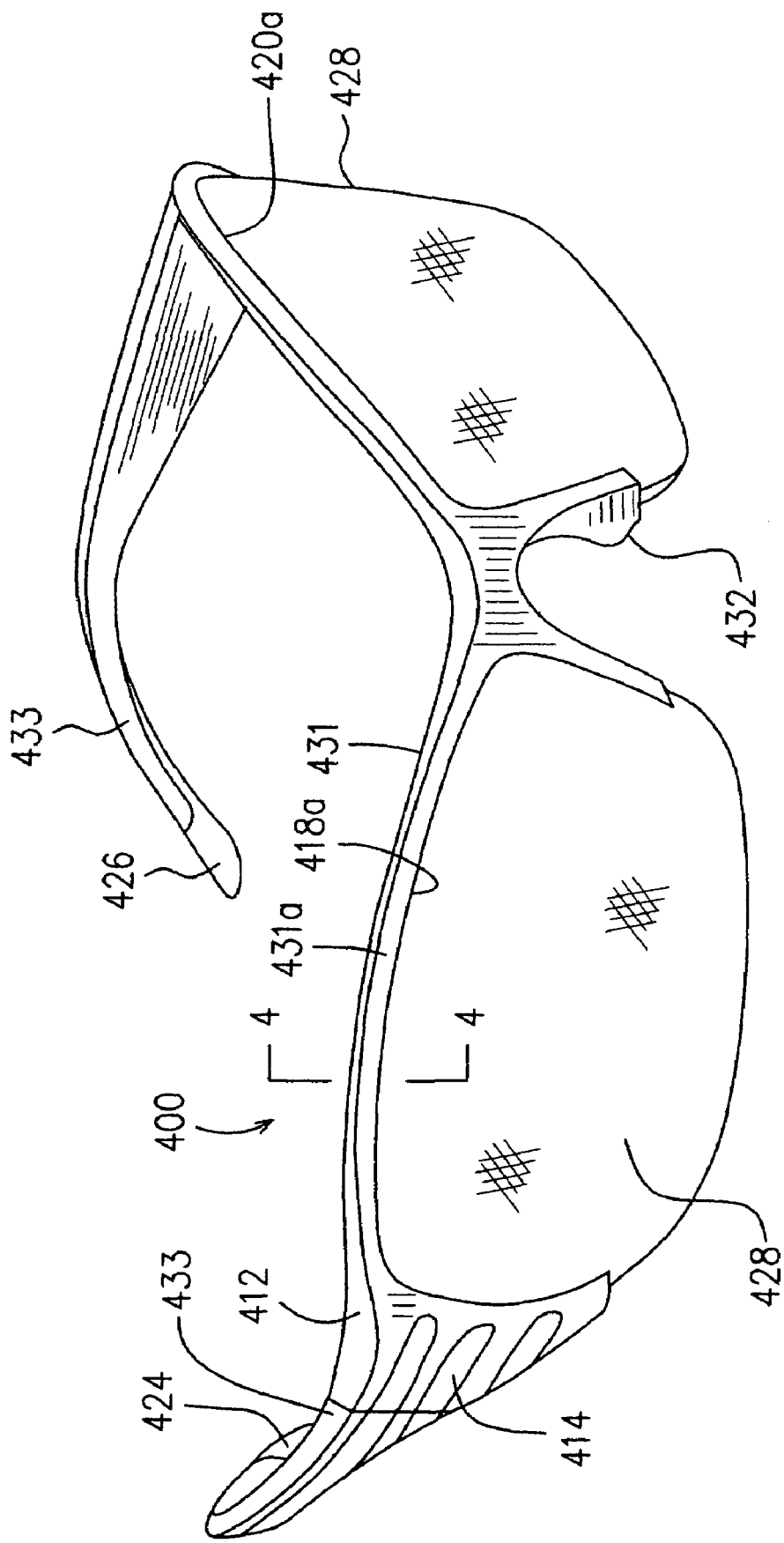
FIG. 4A is a perspective view of a pair of eyeglasses configured for attachment of the lenses to the frame thereof in accordance with a still further embodiment of the present invention.

FIGS. 4A-4C illustrate a further embodiment of the present invention in which, a pair of eyeglasses 400 generally includes components similar to those of the eyeglasses 200 of FIG. 2. Components of the eyeglasses 400 are indicated by numerals in the 400 series with the last two digits similar to the numerals indicating similar components of the eyeglasses 200 of FIG. 2, and will not therefore be redundantly described. The difference between the eyeglasses 400 and the eyeglasses 200 of FIG. 2 is that instead of having a cushioning pad 230 attached to the frame body 214 at the rear side of the eyeglasses 200 of FIG. 2, the eyeglasses 400 have a cushioning pad 431 as a secondary portion of the frame structure 412, which is a single layer of soft material, preferably rubber, attached not only to the rear side of the frame body 414 but also to the front side and the top surface of the frame body 414. Therefore, the frame body 414 of FIG. 4A is only visible through cut-out areas of the cushioning pad 431.

The temples 424, 426 each are also at least partially wrapped by a cushioning pad 433 of the same material as that of cushioning pad 431, to cover both sides of the temples 424, 426. The cushioning pad 433 is separated from cushioning pad 431 in order to avoid interference with the pivoting motion of the temples 424, 426.

The cushioning pad 431 includes a portion 431a attached to a front side 414a of the frame body 414 near a peripheral recess 419, which extends to abut a peripheral area of the front side 428b of the lens 428. Thus, the portion 431a of the cushioning pad 431 forms an integral retainer extending from a rear section of cushioning pad 431, over the frame body 414 to contact the front side 428b of the lens 428, thereby engaging the lens 428 in attachment with the frame body 414.

The structural arrangement illustrated in FIG. 4B engages the lens 428 to the frame body 414 provided that an incomplete aperture 418a surrounds more than one half of the entire circumference of the lens 428. A structural arrangement illustrated in FIG. 4C which is alternative to the structural arrangement shown in FIG. 4B, is preferred, particularly when the frame structure 412 is configured to surround less than one half of the circumference of the lens 428 or to only contact the upper peripheral portion of the lens 428.

In FIG. 4C, the lens 428 defines a groove 442, similar to groove 342 of FIG. 3E but on the front side 428b of the lens 428. A bar 444 which is similar to bar 344 in FIG. 3B is integrated with the front portion 431a of the cushioning pad 431 and protrudes rearwardly into the groove 442. Therefore, the bar 444 and the front portion 431a of the cushioning pad 431 together form an integral retainer of the cushioning pad 431 to secure the lens 428 in attachment with the frame body 414.

Alternatively, bar 444 in FIG. 4C can have other cross-sectional configurations such as square or rectangular. In this structural arrangement the lens 428 is restricted between the frame body 414 and the front portion 431a of the cushioning pad 431 and the bar 444 is needed to prevent the lens 428 from downward movement relative to the frame body 414. Bar 444 may also be replaced by a plurality of studs integrated with the front portion 431a of the cushioning pad 431 and may protrude rearwardly into corresponding recesses defined in the lens 428 on the front side 428b thereof.

It should be noted that the single layer of soft material which is the cushioning pad 433 substantially wraps the frame body 414 of eyeglasses 400 in the embodiment of FIG. 4A-4C and may be alternated. For example, cushioning pads used in other embodiments of the present invention may have one or more additional front portions extending from the cushioning pads attached to the rear side of the frame body to extend forwardly over the frame body and contact the front side of the lens at selected locations thereof. This alternative arrangement will have a similar cross-sectional view to that illustrated in FIGS. 4B and 4C and provides a substantially similar function.

The structural arrangements described in the above-embodiments of the present invention can be achieved during formation of the cushioning pad with or without the presence of the lens in a molding process such that the retainer of the cushioning pad is formed together with the cushioning pad. The retainer in use is in contact with the lens to secure the lens in attachment to the frame body. The molding process may include a double injection step in the presence of the lens for formation of the respective frame body and pad having the retainer. During the double injection, different molding materials for example the plastic material and rubber in their flowable conditions are injected into respective cavities of a mold for the eyeglasses. The lens or lenses are prepositioned with respect to the mold such that when the molding process is completed, the lens or lenses are secured in attachment to the frame body by the retainer formed together with the cushioning pad (or the secondary portion of the frame structure).

The molding process may include an injection step in the presence of both the lens and frame body for formation of the pad having the retainer. In this procedure the frame body is made in a previous process which may not be a molding process. For example the frame body can be made of a metal material. Prior to the injection step, the lens or lenses are placed in attachment to the frame body and the lens or lenses and the frame body are positioned with respect to a molding device which defines a cavity for the secondary portion or the cushioning pad with the retainer. The molding material such as rubber in a flowable condition thereof is directly injected into the cavity of the molding device to flow over the frame body from the rear side of the frame body to the front side of the frame body, thereby forming the retainer contacting the front side of the lens to maintain the rear side of the lens rested on the frame body, as shown in FIGS. 4B and 4C. In other embodiments the injected material may be directed to flow via a passage such as holes 134 or 334 in FIGS. 1B, 3B and 3C extending through the frame body into a hollow space (holes 136 or groove 342) defined in the lens to form at least a part of the retainer within the hollow space.

Modifications and improvements to the above-described embodiments of the present invention may become apparent to those skilled in the art. The foregoing description is intended to be exemplary rather than limiting. For example, the cushioning pad has been described as a preferable embodiment of a secondary portion of the frame structure, having a soft property for cushioning the user's skin. Nevertheless, the softer secondary portion of the frame structure may be configured differently, for example a soft and resilient seal may be provided at the rear side of the frame body around the lens or lenses of an eyewear. A retainer can be formed integrally with the seal during formation of the seal to provide similar structural configuration as described in the above-embodiments. Furthermore, the secondary portion can be made from a substantially rigid material which occurs in a molding process the same as or different from the substantially rigid material of the major portion of the frame (the frame body), for other consideration. Eyewear may also have a single lens attached thereto in accordance with the present invention, although eyewear having a pair of lenses were described as embodiments of this invention. The scope of the present invention is therefore intended to be limited solely by the scope of the appended claims.

I claim:

1. A structural arrangement of eyewear for attaching a substantially rigid lens to a frame thereof, comprising:
   a frame body made of a substantial rigid material;
   a secondary portion of the frame attached to the frame body at a rear side thereof; and
   at least one retainer as a part of the secondary portion formed during formation of the secondary portion, the retainer of the secondary portion in contact with the lens securing the lens in attachment to the frame body.

2. The structural arrangement as defined in claim 1 wherein the secondary portion comprises at least one pad softer than the frame body for contacting the skin of a user, and wherein the retainer contacts at least one surface of the lens other than a surface of a rear side of the lens in order to maintain the rear side of the lens resting on the frame body.

3. The structural arrangement as defined in claim 2 wherein the surface of the lens in contact with the retainer comprises a surface of a front side of the lens.

4. The structural arrangement as defined in claim 2 wherein the lens defines a hollow space therein for receiving the retainer.

5. The structural arrangement as defined in claim 4 wherein the frame body defines a plurality of holes extending therethrough and wherein the retainer comprises a plurality of studs protruding forwardly from the pad through the respective holes of the frame body into the hollow space defined in the lens.

6. The structural arrangement as defined in claim 5 wherein the hollow space in the lens is defined as a plurality of holes extending through the lens and wherein the studs extend through the respective holes in the lens, each having an enlarged end abutting a surface of a front side of the lens.

7. The structural arrangement as defined in claim 4 wherein the hollow space in the lens is defined as a groove formed in the lens at one side thereof, a distance between opposed walls at an opening of the groove being smaller than a distance between the opposed walls at a bottom thereof, at least a part of the retainer being shaped to fit into the groove.

8. The structural arrangement as defined in claim 2 wherein the retainer protrudes forwardly over the frame body such that a front portion of the retainer contacts the surface of the front side of the lens.

9. The structural arrangement as defined in claim 2 wherein the pad extends around the lens to form a seal.

10. The structural arrangement as defined in claim 2 wherein the pad is made of rubber.

11. A method for attaching a substantially rigid lens to a substantially rigid plastic frame body of eyewear, the frame body at a rear side thereof having at least one pad attached thereto, the method comprising a step of forming a retainer together with the pad during formation of the pad in the presence of the lens in a molding process such that the retainer is formed in contact with the lens to secure the lens in attachment to the frame body.

12. The method as defined in claim 11 wherein the molding process comprises a double injection step in the presence of the lens for formation of the respective frame body and pad having the retainer.

13. The method as defined in claim 11 wherein the molding process comprises an injection step in the presence of both the lens and frame body, for formation of the pad having the retainer.

14. The method as defined in claim 13 wherein the injection step comprises directing an injected material to flow over the frame body during the molding process such that a part of the formed retainer contacts a front side of the lens to maintain a rear side of the lens resting on the frame body.

15. The method as defined in claim 13 wherein the injection step comprises directing an injected material to flow into a hollow space defined in the lens via a passage extending through the frame body, in order to form at least a part of the retainer within the hollow space.

16. A method for attaching a substantially rigid lens to a frame of eyewear, the frame including a major portion of substantially rigid plastic material to form a substantial configuration of the frame, and a secondary portion of a material attached to the major portion, the method comprising a step of forming a retainer as a part of the secondary portion during formation of the secondary portion in a molding process, the retainer of the secondary portion being formed in contact with the lens to secure the lens in attachment to the major portion of the frame.

17. The method as defined in claim 16 wherein the molding process comprises an injection step in the presence of both the lens and the major portion of the frame, for formation of the secondary portion of the frame having the retainer.

18. The method as defined in claim 16 wherein the molding process comprises a double injection step in the presence of the lens, for formation of the respective major portion of the frame and the secondary portion of the frame having the retainer.

19. The method as defined in claim 16 wherein the material forming the secondary portion of the frame is softer than the material forming the major portion of the frame.

20. The method as defined in claim 16 wherein the material forming the secondary portion of the frame is the same material of the major portion of the frame.

* * * * *